United States Patent
Podlaski-Pyzik et al.

(10) Patent No.: US 6,902,810 B1
(45) Date of Patent: Jun. 7, 2005

(54) MULTILAYER SYSTEMS WITH AT LEAST ONE LAYER BASED ON MESONORPHIC POLYELECTROLYTE COMPLEXES METHOD FOR PRODUCING THEM AND THEIR USE

(75) Inventors: Beate Podlaski-Pyzik, Münster (DE); Astrid Halfmann, Münster (DE); Wolfgang Bremser, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/869,025
(22) PCT Filed: Dec. 21, 1999
(86) PCT No.: PCT/EP99/10242
§ 371 (c)(1), (2), (4) Date: Jul. 30, 2001
(87) PCT Pub. No.: WO00/38846
PCT Pub. Date: Jul. 6, 2000

(30) Foreign Application Priority Data
Dec. 24, 1998 (DE) .......................... 198 60 170

(51) Int. Cl.[7] .............................. B32B 9/04; B05D 3/02; B05D 7/00
(52) U.S. Cl. .................. 428/411.1; 428/1.1; 428/423.1; 428/923.3; 428/480; 427/384; 427/385.5; 427/407.1; 427/496; 427/517
(58) Field of Search .............................. 427/407.1, 384, 427/385.5, 496, 517; 428/1.1, 411.1, 423.1, 423.3, 480

(56) References Cited

U.S. PATENT DOCUMENTS

5,725,941 A * 3/1998 Mezger ...................... 428/327
5,863,956 A * 1/1999 Kistenmacher et al. ....... 521/31

FOREIGN PATENT DOCUMENTS

DE 44 28 641 A1 2/1996 ............. C08F/8/00
EP WO 96/05235 2/1996 ............. C08F/8/44

* cited by examiner

*Primary Examiner*—Elena Tsoy

(57) ABSTRACT

A multicoat system comprising
(I) at least one constituent (IA) comprising mesomorphic polyelectrolyte complexes prepared by reacting, in a liquid phase (IB), at least one polymeric and/or oligomeric, organic, anionic polyelectrolytes (IC) with at least one polymeric and/or oligomeric, organic, cationic polyelectrolytes (ID) and/or at least one cationic surfactant (IE) or at least one polymeric and/or oligomeric, organic, cationic polyelectrolytes (ID) with at least one anionic surfactant (IF) in a stoichiometric or non-stoichiometric ratio, pouring the resulting liquid phase (IG) onto a substrate or into a mold and allowing it to solidify, and heat-treating the resulting solid (IH); and
(II) at least one coat (IIA), which is three-dimensionally crosslinked, prepared by applying at least one aqueous, thermally curable coating material (IIB) comprising at least one binder (IIC) and at least one crosslinking agent (IID), to the surface of the constituent (IA), and thermally curing the resulting wet film (IIE).

18 Claims, No Drawings

MULTILAYER SYSTEMS WITH AT LEAST ONE LAYER BASED ON MESONORPHIC POLYELECTROLYTE COMPLEXES METHOD FOR PRODUCING THEM AND THEIR USE

The present invention relates to novel multicoat systems, especially moldings, laminates or multicoat surface-coating systems, which comprise at least one coat based on mesomorphic polyelectrolyte complexes. The invention also relates to novel reactive systems which make it possible to produce the novel multicoat systems, and to a process for preparing them. The present invention is further directed to a process for producing the novel multicoat systems using the novel reactive systems. The present invention relates not least to the use of the novel multicoat systems as shaped parts or laminates, especially in automobile construction, and to the use of the novel reactive systems in automotive OEM finishing and refinish, industrial coating, including coil coating, and furniture coating.

Polyelectrolyte complexes are able through self-organization to form what are known as mesomorphic phases. These have a long-range order even in the liquid phase. The precipitated polyelectrolyte complexes can be used to produce flexible films which are of high homogeneity and optical quality and also, in many cases, of high mechanical strength (cf. the article by Markus Antonietti and Christine Göltner, "Überstrukturen funktioneller Kolloide: eine Chemie im Nanometerbereich" in Angewandte Chemie, Volume 109, 1997, pages 944 to 964, or the article by C. K. Ober and G. Wegner, "Polyelectrolyte-Surfactant Complexes in the Solid State: Facile Building Blocks for Self-Organizing Materials" in Advanced Materials, Volume 9, 1997, pages 17 to 31. However, this article does not disclose whether the precipitated polyelectrolyte complexes are suitable for particularly demanding applications, such as in shaped parts or laminates or as coating materials, especially as primer coats for multicoat surface-coating systems.

In their paper "Structural studies on thin organic coatings built by repeated adsorption of polyelectrolytes" given at the 23$^{rd}$ International Conference in Organic Coatings in Athens, Greece, A. M. Jonas et al. describe the production of ultrathin multiple layers by repeated adsorption of polymers such as poly(vinyl sulfate) or poly(styrenesulfonic acid) on the one hand and poly(ethyleneimine) on the other. Nothing, however, is said about potential applications.

The preparation of these known mesomorphic polyelectrolyte complexes requires the use of pure starting compounds, which is a disadvantage in terms of the economy of the processes and the availability of the starting compounds.

Furthermore, it is an object of the present invention to provide a novel process which permits simple production of the novel multicoat systems, especially the multicoat surface-coating systems.

In addition, it is an object of the present invention to find novel reactive systems which have innovative, advantageous combinations of properties and which, consequently, open up new fields of use for mesomorphic polyelectrolyte complexes, especially in the production of novel multicoat systems.

The invention accordingly provides the novel multicoat system comprising
(I) at least one constituent (IA) which consists of or comprises mesomorphic polyelectrolyte complexes and which can be prepared by
  I.1) reacting, in a liquid phase (IB),
    I.1.1) at least one polymeric and/or oligomeric, organic, anionic polyelectrolyte (IC) with at least one polymeric and/or oligomeric, organic, cationic polyelectrolyte (ID) and/or at least one cationic surfactant (IE)

Mesomorphic polyelectrolyte complexes which are used to produce films, foils, fibers, moldings and coatings are known from the German patent application DE-A-44 28 641 or the European patent EP-A-0 775 162. These are principally mesomorphic complexes formed from anionic or cationic polyelectrolytes on the one hand and cationic or anionic surfactants on the other. They already possess numerous advantageous performance properties; however, their resistance to water, organic and inorganic acids and bases, and organic solvents as well, is capable of further improvement. Moreover, it is unknown whether they are suitable for producing shaped parts, laminates or multicoat surface-coating systems.

The international patent application WO 97/14751 describes the preparation of a water-dispersible resin, in which the aqueous dispersion of a modified epoxy resin having quaternary ammonium hydroxide groups is neutralized with the aqueous dispersion of an acrylic acid polymer. Aqueous ammonia is added to the resulting dispersion, after which methyl methacrylate is subjected to free-radical polymerization in this medium. The resulting water-dispersible resin is used to prepare aqueous coating compositions. These conventional and known coating materials do not form mesomorphic phases.

The German patent application DE-A-44 45 200 describes coating materials which comprise binders A) which carry groups at least some of which are ionic. In addition, they comprise further binders C), which are miscible with one another both at the storage temperature and at the curing temperature of the coating compositions and which carry ionic groups whose charge is opposite to the charge of the binders A). In these compositions, the amounts of binders A) on the one hand and of the binders C) on the other hand are harmonized with one another such that from 0.5 to 70% of the number of charges of the ionic groups of A) are neutralized by the charges of the ionic groups of C). The binders C) are added primarily in the form of pigment pastes. The coating materials are used to produce single-coat and multicoat finishing systems in the automotive sector. These customary and known coating materials, however, do not form mesomorphic phases.

Furthermore, multicoat surface-coating systems are customary and known in the fields of automotive finishing, industrial coating, and the furniture industry. By way of example, reference may be made to the paint systems comprising electrocoat, primer-surfacer, base coat and clear coat that are used in the OEM finishing of automobiles. Multicoat surface-coating systems which include at least one coat based on mesomorphic polyelectrolyte complexes, however, have not been described todate.

It is an object of the present invention to provide novel multicoat systems, especially shaped parts, laminates or multicoat surface-coating systems, which comprise at least one coat based on mesomorphic polyelectrolyte complexes and offer an alternative to the existing shaped parts, laminates and multicoat surface-coating systems. In particular, the coats based on mesomorphic polyelectrolyte complexes should no longer have the disadvantages of the existing coats based on mesomorphic polyelectrolyte complexes, but should instead make it possible to produce the novel multicoat systems, especially the multicoat surface-coating systems.

In particular, the novel multicoat systems, especially the multicoat surface-coating systems, should combine good adhesion between the individual layers and any substrate present, and a high level of hardness, with high flexibility and high resistance to water, organic and inorganic acids or bases and solvents. In addition, they should be stable to weathering and light, so that they are also suitable for outdoor applications. The mesomorphic polyelectrolyte complexes used to produce the novel multicoat systems, especially the multicoat surface-coating systems, should not least be preparable not only from the pure starting compounds but also from the mixtures as obtained in the industrial production of such starting compounds.

or
  I.1.2) at least one polymeric and/or oligomeric, organic, cationic polyelectrolyte (ID) with at least one anionic surfactant (IF)
    in a stoichiometric or non-stoichiometric ratio,
I.2) pouring the resulting liquid phase (IG) onto a substrate or into a mold and
I.3) allowing it to solidify, and
I.4) heat-treating the resulting solid (IH);
and
(II) at least one coat (IIA) which is three-dimensionally crosslinked and can be prepared by
  II.1) applying at least one aqueous, thermally curable coating material (IIB) comprising
    II.1.1) at least one binder (IIC) and
    II.1.2) at least one crosslinking agent (IID), to the surface of the constituent (IA), and
  II.2) thermally curing the resulting wet film (IIE).

In the context of the present invention the term "multicoat system" embraces shaped parts of any desired external form, planar or substantially planar laminates, and multicoat surface-coating systems. In the text below, the novel multicoat system is referred to as the "multicoat system of the invention".

Also provided is the novel process for producing the multicoat system of the invention, by first
(I) preparing at least one constituent (IA) which consists of or comprises mesomorphic polyelectrolyte complexes, by
  I.1) reacting, in a liquid phase (IB),
    I.1.1) at least one polymeric and/or oligomeric, organic, anionic polyelectrolyte (IC) with at least one polymeric and/or oligomeric, organic, cationic polyelectrolyte (ID) and/or at least one cationic surfactant (IE) or
    I.1.2) at least one polymeric and/or oligomeric, organic, cationic polyelectrolyte (ID) with at least one anionic surfactant (IF)
      in a stoichiometric or nonstoichiometric ratio,
  I.2) pouring the resulting liquid phase (IG) onto a substrate or into a mold, and
  I.3) allowing it to solidify, and
  I.4) heat-treating the resulting solid (IH);
and then, on the resulting constituent (IA),
(II) preparing at least one coat (IIA) which is three-dimensionally crosslinked by
  II.1) applying at least one aqueous, thermally curable coating material (IIB) comprising
    II.1.1) at least one binder (IIC) and
    II.1.2) at least one crosslinking agent (IID) to the surface of the constituent (IA), and
  II.2) thermally curing the resulting wet film (IIE).

In the text below, the novel process for producing the multicoat system of the invention is referred to for brevity's sake as the "process of the invention".

The invention provides not least the novel reactive system which comprises
(I) at least one mesomorphic polyelectrolyte complex comprising
  I.1.1) at least one polmeric and/or oligomeric, organic, anionic polyelectrolyte (IC) and at least one polymeric and/or oligomeric, organic, cationic polyelectrolyte (ID) and/or at least one cationic surfactant (IE)
    or
  I.1.2) at least one polymeric and/or oligomeric, organic, cationic polyelectrolyte (ID) and at least one anionic surfactant (IF) and also
(II) at least one aqueous, thermally curable coating material (IIB) comprising
  II.1.1) at least one binder (IIC) and
  II.1.2) at least one crosslinking agent (IID)

In the light of the prior art it was surprising and unforeseeable that the problems on which the present invention is based could be solved with the aid of the parts, process and reactive system of the invention. Particularly noteworthy is the simple and elegant, and thus advantageous and economic, way in which mesomorphic polyelectrolyte complexes formed from conventional starting compounds can be incorporated into the multicoat system of the invention and so can be supplied for new fields of use.

The first component (I), essential to the invention, of the multicoat system of the invention is the constituent (IA). The multicoat system of the invention may comprise one or more constituents (IA).

The constituent (IA) consists of or comprises at least one mesomorphic polyelectrolyte complex. Which variant is preferred in the individual case depends exclusively on the particular intended use of the multicoat system of the invention.

The unambiguous detection of mesomorphic structures is made, as is known, by means of small-angle X-ray diffractometry. In this case there is at least one narrow scatter peak which is characteristic of a liquid-crystalline morphology in the constituent (IA). Furthermore, for the majority of mesomorphic structures, polarization micrographs under crossed polarizers are known to show typical textures of birefringent domain structures.

For the preparation of the constituent (IA), in a first variant of the process of the invention, in the liquid phase (IB), at least one polymeric and/or oligomeric, organic, anionic polyelectrolyte (IC) is reacted with at least one polymeric and/or oligomeric, organic, cationic polyelectrolyte (ID) and/or at least one cationic surfactant (IE).

Suitable polyelectrolytes (IC) for use in accordance with the invention contain anionic groups such as carboxylate, sulfonate, sulfite, sulfate, phosphate, phosphonate or borate groups, of which the carboxylate, sulfonate and phosphonate groups are particularly advantageous and so are used with particular preference.

Examples of suitable polyelectrolytes (IC) for use in accordance with the invention are polyesters and oligoesters, polyurethanes and oligourethanes, polymers ammonium salts, examples being acrylic acid, methacrylic acid, dimethylacrylic acid, ethylacrylic acid, allylacetic acid or vinylacetic acid; monoethylenically unsaturated $C_4$ to $C_8$ dicarboxylic acids, their monoesters, anhydrides, alkali metal salts and/or ammonium salts, examples being maleic acid, fumaric acid, itaconic acid, mesaconic acid, methylene malonic acid, citraconic acid, maleic anhydride, itaconic anhydride or methylmalonic anhydride; sulfo-functional monoethylenically unsaturated monomers, examples being allylsulfonic acid, styrenesulfonic acid, 2-acrylamido-2-methylpropanesulfonic acid, methallylsulfonic acid, vinylsulfonic acid, 3-sulfopropyl acrylate or 3-sulfopropyl methacrylate; and phosphono-functional monoethylenically unsaturated monomers, examples being vinylphosphonic acid, allylphosphonic acid or acrylamidomethylpropanephosphonic acid.

The polyelectrolytes (IC) are used in the acid form or in partially or fully neutralized form.

In this context, up to 80 mol % of the monomer units of the polyelectrolyte (IC) can consist of one or more nonionic monomers of group (2):

Group (2): $C_1$ to $C_{20}$ alkyl and hydroxyalkyl esters of monoethylenically unsaturated $C_3$ to $C_{10}$ monocarboxylic acids or $C_4$ to $C_8$ dicarboxylic acids, examples being oligomers of olefinically unsaturated compounds, epoxy resins or alkyd resins containing the abovementioned anionic groups.

The preparation of these polyelectrolytes (IC) is known per se. For example, the oligoesters or polyesters can be prepared by reacting polyols with an excess of polycarboxylic acids. The oligourethanes or poly-urethanes can be obtained by reacting polyols, polyisocyanates and dihydroxy carboxylic acids such as dimethylolpropionic acid. The anionic groups can easily be introduced into the epoxy resins by reacting the epoxide groups with phosphoric acid. The oligomers and polymers of olefinically unsaturated compounds having anionic groups can be prepared in a simple manner by oligomerizing or polymerizing suitable olefinically unsaturated compounds.

Of these, the polymers and oligomers of olefinically unsaturated compounds are particularly advantageous and are preferably used in accordance with the invention.

Of these, in turn, especially advantageous polyelectrolytes (IC) are those which contain from 20 to 100 mol % of one, or of a mixture of two or more, of the following monomer units of group (1):

Group (1): monoethylenically unsaturated $C_3$ to $C_{10}$ monocarboxylic acids, their alkali metal salts and/or methyl acrylate, ethyl acrylate, n-butyl acrylate, stearyl acrylate, diethyl maleate, hydroxyethyl acrylate, hydroxypropyl acrylate, hydroxybutyl acrylate, hydroxyethyl methacrylate or hydroxypropyl methacrylate; (meth)acrylic esters of alkoxylated $C_1$ to $C_{18}$ alcohols reacted with from 2 to 50 mol of ethylene oxide, propylene oxide, butylene oxide or mixtures thereof; amides and N-substituted amides of monoethylenically unsaturated $C_3$ to $C_{10}$ monocarboxylic acids or $C_4$ to $C_8$ dicarboxylic acids, examples being acrylamide, methacrylamide, N-alkylacrylamide or N,N-dialkylacrylamide having 1 to 18 carbon atoms in each alkyl group, such as N-methylacrylamide, N,N-dimethylacrylamide, N-tert-butylacrylamide or N-octadecylacrylamide, N-methylhexylmaleamide, N-decylmaleamide, dimethylaminopropylmethacrylamide or acrylamidoglycolic acid; alkylamidoalkyl (meth)acrylates, examples being dimethylaminoethyl acrylate, dimethylaminoethyl methacrylate, ethylaminoethyl acrylate, diethylaminoethyl methacrylate, dimethylaminopropyl acrylate or dimethylaminopropyl methacrylate; vinyl esters, such as vinyl formate, vinyl acetate or vinyl propionate, which following polymerization may also be in hydrolyzed form; N-vinyl compounds, examples being N-vinylpyrrolidone, N-vinylcaprolactam, N-vinyl-formamide, N-vinyl-N-methylformamide, 1-vinylimidazole or 1-vinyl-2-methylimidazole; vinyl ethers of $C_1$ to $C_{18}$ alcohols, vinyl ethers of alkoxylated $C_1$ to $C_{18}$ alcohols, and vinyl ethers of polyalkylene oxides such as polyethylene oxide, polypropylene oxide or polybutylene oxide; and linear, branched or cyclic olefins, examples being ethene, propene, butene, isobutene, 1-pentene, cyclopentene, 1-hexene, 1-heptene, 1-octene, 2,4,4-trimethyl-1-pentene, 1-nonene, 1-decene, styrene or its derivatives such as alpha-methylstyrene, indene, dicyclopentadiene or higher olefins carrying reactive double bonds, such as oligopropene and polyisobutene.

The cationic polyelectrolytes (ID) are also oligoesters and polyesters, oligourethanes and polyurethanes, oligomers and polymers of olefinically unsaturated compounds, or epoxy resins and alkyd resins, but in this instance contain cationic groups. It is also possible to use oligomers and polymers which contain amino groups in the main chain.

Examples of suitable cationic groups are primary, secondary, tertiary and quaternary ammonium groups or sulfonium groups, of which the ammonium groups are particularly advantageous and are therefore used with particular preference.

For the preparation of oligomers and polymers containing amino groups or ammonium groups, for example, the monomers listed in group (3) are used in proportions of from 20 to 100 mol %.

Group (3): monomers carrying amino groups or imino groups, such as, for example, dimethylaminoethyl acrylate, diethylaminoethyl methacrylate, dimethylaminopropylmethacrylamide or allylamine;

monomers which carry quaternary ammonium groups, present, for example, in the form of salts as obtained by reacting the basic amino functions with acids such as hydrochloric acid, sulfuric acid, nitric acid, formic acid or acetic acid, or in quaternized form (examples of suitable quaternizing agents are dimethyl sulfate, diethyl sulfate, methyl chloride, ethyl chloride or benzyl chloride), such as dimethylaminoethyl acrylate hydrochloride, diallyl-dimethylammonium chloride, dimethylaminoethyl acrylate methochloride, dimethylaminoethylaminopropyl-methacrylamide methosulfate, vinylpyridinium salts or 1-vinylimidazolium salts, for example;

monomers in which the amino groups and/or ammonium groups are liberated only after polymerization and subsequent hydrolysis, such as N-vinylformamide or N-vinylacetamide, for example.

In this case up to 80 mol % of the monomer units of the polyelectrolyte (ID) can consist of one or more nonionic monomers of group (2).

Further compounds which can be used as polyelectrolytes (ID) are polyethyleneimine or polypropyleneimine.

Also suitable are epoxy resins whose epoxide groups have been reacted with amines and/or ketiminized amines.

These polyelectrolytes (ID) are used in the form of the base or in partially or completely neutralized form.

Examples of suitable cationic surfactants (IE) are those which include ammonium groups, the ammonium compound being based advantageously on an open-chain amine, such as, for instance, $C_8$ to $C_{18}$ alkyltrimethylammonium chlorides or bromides, ditallowdimethylammonium chloride or laurylbenzyl-dimethylammonium chloride.

Further examples of suitable cationic surfactants (IE) are those which include sulfonium groups. Surfactants of this kind are obtained by reacting epoxy resins with secondary sulfides such as thiodiethanol in the presence of acids.

Further examples of cationic surfactants (IE) are those based on a cyclic amine or imine, examples being surfactants comprising pyridinium, imidazolinium, piperidinium, oxazolinium or pyrimidinium groups.

For the preparation of the constituent (IA), in a further variant of the process of the invention, polymeric and/or oligomeric, organic, cationic polyelectrolytes (ID) are reacted with anionic surfactants (IF).

Examples of suitable polyelectrolytes (ID) are described above in detail.

Examples of suitable surfactants (IF) are alkylbenzenesulfonates, fatty alcohol sulfates, fatty alcohol polyglycol ether sulfates, alkyl glyceryl ether sulfonates, fatty alcohol polyglycol ether methyl-carboxylates, paraffin-sulfonates, olefin-sulfonates, sulfosuccinic monoesters and diesters, alkylphenol ether sulfates, and alkyl and dialkyl phosphates, especially $C_8$ to $C_{18}$ alkanesulfonates, $C_{12}$ to $C_{16}$ alkyl sulfates, $C_{12}$ to $C_{16}$ alkylsulfosuccinates or sulfated ethoxylated $C_{12}$ to $C_{16}$ alcohols.

Further examples of suitable surfactants (IF) are sulfated fatty acid alkanolamines, alpha-sulfo fatty acid esters, fatty acid monoglycerides or fatty acid esters, sarcosides, glycolates, lactates, taurides or isethionates or the customary soaps, i.e., the alkali metal salts of natural fatty acids.

The surfactants (IF) can be in the form of their sodium, potassium or ammonium salts or else as soluble salts of organic bases such as mono-, di- or triethanolamine or other substituted amines.

Particularly advantageous multicoat systems of the invention are obtained if the polyelectrolytes (IC) described above in detail are reacted with the polyelectrolytes (ID) and/or the surfactants (IE) described above in detail, but especially the polyelectrolytes (ID). This variant is therefore particularly preferred in accordance with the invention.

Further particular advantages arise if the polyelectrolytes (IC) and (ID) selected have polymer main chains which looked at independently would not be compatible with one another but would separate again in solid phase. The skilled worker is therefore able to select, in a simple manner, especially advantageous combinations of polyelectrolytes (IC) and (ID).

The constituent (IA) is prepared, in a procedure in accordance with the invention, in a liquid phase (IB) In accordance with the invention, the starting compounds in the liquid phase (IB) form mesomorphic polyelectrolyte complexes and/or precursors thereof, resulting in the liquid phase (IG).

Examples of suitable liquid phases are homogeneous melts which consist essentially of the polyelectrolytes (IC) to be used in accordance with the invention, which are described below in detail, on the one hand, and of polyelectrolytes (ID) and/or surfactants (IE) on the other hand, or of the polyelectrolytes (ID) and surfactants (IF) to be used in accordance with the invention, or substantially molecularly disperse, homogeneous solutions of the abovementioned starting compounds in aqueous, aqueous-organic or organic media.

For the purposes of the present invention, aqueous media are understood as meaning water or aqueous solutions of organic and inorganic acids, bases, salts or other, covalent compounds, with the exception of organic solvents.

By aqueous-organic media are meant the abovementioned media when they include effective amounts of organic solvents. Effective amounts are amounts which cause the starting compounds that would be insoluble in purely aqueous media to dissolve therein. In addition, they may include organic and inorganic acids, bases, salts or other, covalent compounds which are soluble therein.

Organic media are purely organic solvents or solvent mixtures which may include organic and inorganic acids, bases, salts or other, covalent compounds which are soluble therein.

Which variant for preparing a constituent (IA) of the invention offers the most advantages can be decided simply by the skilled worker on the basis of the properties of the abovementioned starting compounds.

For instance, starting compounds suitable for the preparation of the constituents (IA) in the melt (IB) are primarily thermoplastics. These can be mixed and reacted further, for example, in a conventional and known compounder or extruder.

Where the constituents (IA) are prepared in solution, it is advantageous to purify the resulting mesomorphic polyelectrolyte complexes and/or their precursors in solution by repeated precipitation from the solution, and redissolution. If appropriate, excess reactants and salts can be washed out by repeatedly washing the organic medium with water in the manner of a sol-gel separation process. These purification techniques can of course also be applied to the mesomorphic polyelectrolyte complexes and/or their precursors which have been produced in a melt.

In accordance with the invention, the polyelectrolytes (IC) can be reacted with the polyelectrolytes (ID) and/or the surfactants (IE), or the polyelectrolytes (ID) can be reacted with the surfactants (IF), in a stoichiometric or nonstoichiometric ratio. Which variant is chosen in this case depends on the desired profile of properties of the constituent (IA). The skilled worker is therefore able to determine the most advantageous reaction conditions on the basis of simple preliminary experiments.

The purified mesomorphic polyelectrolyte complexes and/or their precursors are then redissolved in a suitable medium or are melted, to give the liquid phase (IG).

The liquid phase (IG) resulting in the procedure of the invention is poured, in the further course of the process of the invention, onto an appropriate substrate. For the purposes of the present inventions, the term "pouring" embraces all customary and known methods of applying liquid phases, such as dipping, spraying, knife coating, brushing, roller coating or pouring in the form of a liquid curtain. Examples of suitable substrates are films, foils, fibers, fabrics or shaped parts, especially autobody components, made of metal, glass, wood, paper, plastic, leather or composite materials. In the course of pouring, these substrates can be at static rest or can be mobile as, for instance, in the case of the coil coating process. For example, the liquid phase (IG) can be poured out in a thin, uniform layer onto a metal strip and then processed further in an appropriate manner.

Alternatively, the resulting liquid phase (IG) can be poured into a mold. For the purposes of the present inventions, this means not only pouring out into a prefabricated solid hollow mold but also shape-imparting processing, especially of melts (IG), by extrusion, coextrusion, injection molding, calendering or film blowing to form foils, films, extrudates, fibers, fabrics, profiles, sheets, tubes, particulate compositions, granules or other shaped parts. These can be used in turn as the substrate for the purposes of the present invention.

This variant of the process of the invention is employed in particular when the intention is to produce, as parts of the invention, shaped parts consisting essentially of the constituent (IA), i.e., those where the constituent (IA) determines the shape.

In a procedure according to the invention, the liquid phase (IG) is allowed to solidify. In the case of the melt (IG), this takes place by cooling and solidification. In the case of liquid phases (IG) containing solvents, the solvents are evaporated at room temperature or higher temperatures, with or without the assistance of reduced pressure.

For the present invention it is essential that the solid (IH) resulting in these procedures is heat-treated. The time which has to be expended for the heat treatment depends on the profile of properties of the solid (IH) in question and can vary greatly from one case to another. In accordance with the invention, however, it is advantageous not to go below a heat-treatment time of one minute and not to exceed a heat-treatment time of ten hours.

The temperatures which are applied in the course of heat treatment depend likewise on the profile of properties of the solid (IH) in question and may therefore likewise vary greatly from one case to another. In accordance with the invention, it is advantageous not to go below 80° C. and not to exceed 300° C. in the course of the heat treatment. Depending on the solid (IH) which is present, short heat-treatment times are combined with high heat-treatment temperatures, or long heat-treatment times with comparatively low heat-treatment temperatures. However, it may well also be necessary to subject the solid (IH) to heat treatment at high temperatures for a long time or at low temperatures for a short time. In the course of the heat treatment, the temperature can be held constant or can be varied in accordance with a predetermined program. Which heat-treatment conditions are advantageous in each individual case can be determined by the skilled worker on the basis of simple preliminary experiments.

The resulting constituent (IA) may compose additives (J). In general, these additives are present in the constituent (IA) in an amount which detracts to a negligible extent if at all from its mesomorphic properties. It is advisable in general to limit the amount of the additives (J) to 60, preferably 50 and, in particular, 40% by weight, based on the total amount of the constituent (IA) plus additives (J). In specific cases, however, these amounts can be exceeded.

Examples of suitable additives (J) are polymers, crosslinkers, crosslinking catalysts, initiators, especially photoinitiators, pigments, dyes, fillers, reinforcing fillers, Theological assistants, wetting agents and dispersants, defoamers, adhesion promoters, additives for improving substrate wetting, additives for improving surface smoothness, dulling agents, leveling agents, film-forming auxiliaries, driers, antiskinning agents, light stabilizers, corrosion inhibitors, biocides, flame retardants, polymerization inhibitors, especially photoinhibitors, or plasticizers, as are customary and known, for example, in the plastics or coatings sector. The selection of the additives (J) depends on the desired profile of properties of the constituent (IA) and on its intended use and can therefore be made by the skilled worker in a simple manner, with the assistance, if appropriate, of simple preliminary experiments.

The additives (J) can be added to the liquid phase (IB), to the liquid phase (IG) and/or to the constituent (IA). In accordance with the invention, it is advantageous to add them to said liquid phases (IB) and/or (IG), since this ensures better distribution of the additives (J).

The second component, (II), essential to the invention, of the multicoat system of the invention is at least one coat (IIA) which is three-dimensionally crosslinked and which is prepared in accordance with the invention by applying at least one aqueous, thermally curable coating material (IIB) comprising at least one binder (IIC) and at least one crosslinking agent (IID) to the surface of the constituent (IA) and thermally curing the resulting wet coat (IIE).

Coating materials suitable for preparing the multicoat system of the invention are in principle all customary and known, commercially available, aqueous, thermally curable coating materials (IIB). Examples of suitable coating materials (IIB) are electrode coat materials, aqueous primer-surfacers, aqueous base coat materials, and aqueous clear coat materials, including powder slurry clear coat materials, as are described, for example, in the patents EP-A-0 643 734, U.S. Pat. No. 4,791,168, U.S. Pat. No. 4,423,179, EP-A-0 424 705, EP-A-0 522 420, EP-A-0 089 492, EP-A-0 521 928, EP-A-0 436 941, JP-A-1280757, EP-A-0 619 329, DE-A-43 22 242, DE-A-41 32 430, EP-A-0 358 979, DE-A-195 42 626, DE-A-44 21 823, EP-A-0 652 264, DE-A-196 17 086, EP-A-0 654 052 and DE-A-196 23 371.

The first key constituent of the aqueous, thermally curable coating materials (IIB) is at least one binder (IIC) which constitutes a water-soluble resin, or else a resin which may be dispersible in the form of a powder slurry, which is oligomeric or polymeric and contains functional groups which are able to react with the corresponding complementary reactive functional groups in the crosslinking agents (IID).

Examples of suitable inventively preferred binders (IIC) are linear and/or branched and/or block, comb and/or random poly(meth)acrylates, polyesters, alkyds, polyurethanes, acrylated polyurethanes, acrylated polyesters, polylactones, polycarbonates, polyethers, epoxy resin-amine adducts, (meth)acrylatediols, partially saponified polyvinyl esters or polyureas, of which the poly(meth)acrylates, the polyesters, the polyurethanes, the polyethers, and the epoxy resin-amine adducts are particularly advantageous and are therefore used with particular preference.

Regarding the preparability, handling and the particularly advantageous properties of the coating compositions of the invention prepared with them, the poly(meth)acrylates, the polyesters and/or the polyurethanes offer very particular advantages and so are used with preference.

Examples of suitable water-soluble or water-dispersible binders (IIC) contain alternatively (i) functional groups which can be converted into cations by neutralizing agents and/or quaternizing agents, and/or cationic groups or (ii) functional groups which can be converted into anions by neutralizing agents, and/or anionic groups and/or (iii) nonionic hydrophilic groups.

Examples of suitable functional groups which can be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups are primary, secondary, tertiary or quaternary ammonium groups, tertiary sulfonium groups or quaternary phosphonium groups, especially quaternary ammonium groups.

Examples of suitable functional groups which can be converted into anions by neutralizing agents are carboxylic acid, sulfonic acid or phosphonic acid groups, especially carboxylic acid groups.

Examples of suitable anionic groups are carboxylate, sulfonate or phosphonate groups, especially carboxylate groups.

Examples of suitable nonionic hydrophilic groups for use in accordance with the invention are polyether groups, especially poly(alkylene ether) groups.

Regarding the preparability, handling, and advantageous properties of the coating materials (IIB) prepared using them, the binders (IIC) which contain the anion-forming groups and/or anions (ii), especially the carboxylic acid groups and/or the carboxylate groups, offer very particular advantages and so are used with preference.

The further key constituent of the aqueous, thermally curable coating materials (IIB) are crosslinking agents (IID) which are able to react with the reactive functional groups of the binders (IIC) to form a three-dimensional thermoset network.

Examples of suitable complementary reactive functional groups which enter into such crosslinking reactions are compiled in the following overview.

| Functional groups in Binder (IIC) and Crosslinker (IID) or Crosslinker (IID) and Binder (IIC) | |
|---|---|
| —SH$_2$ | —C(O)—OH |
| —NH$_2$ | —C(O)—O—C(O)— |
| —OH | —NCO |
|  | —NH—C(O)—OR |
|  | —CH$_2$—OH |
|  | —CH$_2$—O—CH$_3$ |
|  | =Si(OR)$_2$ |
|  | 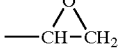 —CH—CH$_2$ |
| —O—C(O)—NH—C(O)—NH$_2$ | —CH$_2$—OH |
| —O—C(O)—NH$_2$ | —CH$_2$—O—CH$_3$ |
| —C(O)—OH | 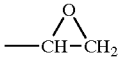 —CH—CH$_2$ |
| —O—C(O)—CR=CH2 | —OH |
|  | —NH$_2$ |
|  | —C(O)—CH$_2$—C(O)—R |

In the overview, the variable R stands for an organic radical, especially an alkyl or aryl radical.

The combination of binders (IIC) containing hydroxyl groups as reactive functional groups, and of crosslinking agents (IID) containing the corresponding complementary functional groups, is of advantage. Corresponding coating materials (IIB) are therefore used with preference.

Examples of crosslinking agents (IID) suitable for the preferred coating materials (IIB) are the customary and known amino resins some of whose methylol and/or methoxymethyl groups may have been defunctionalized by means of carbamate or allophanate groups. Crosslinking agents (IID) of this kind are described in the patents U.S. Pat. No. 4,710,542 and EP-B-0 245 700 and also in the article by B. Singh and coworkers "Carbamylmethylated Melamines, Novel Crosslinkers for the Coatings Industry" in Advanced Organic Coatings Science and Technology Series, 1991, Volume 13, pages 193 to 207.

Further examples of crosslinking agents (IID) suitable for the preferred coating materials (IIB) are compounds or resins containing siloxane groups, compounds or resins containing anhydride groups, compounds or resins containing epoxide groups, blocked and/or unblocked, monomeric and/or oligomeric polyisocyanates, as described for example in "Methoden der organischen Chemie", Houben-Weyl, Volume 14/2, 4th edition, Georg Thieme Verlag, Stuttgart 1963, pages 61 to 70, and by W. Siefken in Liebigs Annalen der Chemie, Volume 562, pages 75 to 136, tris (alkoxycarbonylamino)triazines, as described in the patents U.S. Pat. No. 4,939,213, U.S. Pat. No. 5,084,541, U.S. Pat. No. 5,288,865 and EP-A-0 604 922, and/or beta-hydroxyalkylamides such as N,N,N',N'-tetrakis(2-hydroxyethyl)adipamide or N,N,N',N'-tetrakis(2-hydroxypropyl)adipamide.

Besides these key constituents, the aqueous, thermally curable coating materials (IIB) may comprise the above-described additives (J) in customary and known amounts. They may further comprise constituents which are curable with actinic light, especially UV radiation, and/or electron beams.

In a procedure according to the invention, the above-described aqueous, thermally curable coating materials (IIB) are applied to the surface of the constituents (IA) described in detail above. Viewed in terms of its method, the application has no special features but it is instead guided in particular by whether the constituents (IA) are present as three-dimensional shaped parts or two-dimensional articles, or on three-dimensional shaped parts or two-dimensional articles, and/or by the intended use of the resulting multicoat systems of the invention. In principle, therefore, the application methods recited above are suitable, the skilled worker being able to select the method that is advantageous for the case in hand on the basis of his or her experience, with the assistance where appropriate of rangefinding tests.

In accordance with the invention, the applied wet coats (IIE) are cured thermally. For this it is advantageous to employ temperatures between 100 and 200° C. In specific embodiments of the coating compositions of the invention it is also possible to employ lower curing temperatures of from 100 to 160° C.

Where the aqueous, thermally curable coating materials (IIB) include constituents which are curable with actinic light, especially UV radiation, and/or electron beams, the thermal curing precedes or follows the radiation curing. Curing by radiation, especially UV radiation, has no special features in terms of its method but is instead carried out in customary and known units under the conditions as described, for example by R. Holmes in U.V. and E.B. Curing Formulations for Printing Inks, Coatings and Paints, SITA Technology, Academic Press, London, United Kingdom 1984, or by D. Stoye and W. Freitag (Editors) in Paints, Coatings and Solvents, Second, Completely Revised Edition, Wiley-VCH, Weinheim, N.Y., 1998.

Besides the two components (I) and (II) that are essential to the invention, the multicoat systems of the invention may also include further components. Examples of suitable further components are the above-mentioned substrates, especially the films, foils, fibers, wovens or shaped parts, especially autobody components, made of metal, glass, wood, paper, plastic, leather or composite materials thereof. Further examples of suitable further components are additional coats which are applied to the surface of the coat (IIA) and/or the coat (IA), especially additional paint coats and/or adhesive coats.

The resulting multicoat systems of the invention have diverse possible uses, for example, as shaped parts and laminates, especially in automobile construction, or as a multicoat surface-coating system in automotive OEM finishing and refinish, in industrial coating, including coil coating, and in furniture coating. In these applications the articles, especially the automobiles, coils or furniture which comprise at least one multicoat system of the invention, exhibit good corrosion resistance.

EXAMPLE

1. The Production of Inventive Multicoat Surface-coating Systems 1.1 The Preparation of the Constituent (IA)

1.1.1 The Preparation of an Anionic Polyelectrolyte (IC)

1424.2 parts of butyl glycol were charged to a resin reactor and heated to 140° C. Subsequently, a mixture of 1280 parts of n-butyl acrylate, 144.2 parts of acrylic acid, 28.5 parts of peroxide TBPB (tert-butyl perbenzoate) and 188 parts of butyl glycol was metered in with stirring over the course of two hours. The resulting mixture was then heated at 140° C. with stirring for four hours. The resulting solution of the polymer had a solids content of 50%. The head-group equivalent weight of the polymer was 712 g/mol. The head groups are, as is known, the hydrophilic moiety of a surfactant.

1.1.2 The Preparation of a Polyelectrolyte (ID) Containing Ammonium Groups 490 parts of Epikote$^R$ 1001 (epoxy resin from Shell having an epoxide equivalent weight of 490 g/mol) were dissolved in 190.1 parts of butyl glycol and heated to 100° C. Thereafter, 373.8 parts of DETA ketimine (diketimine prepared from diethylenetriamine and methyl isobutyl ketone, 75% strength in methyl isobutyl ketone) were added and the resulting reaction mixture was heated at from 100 to 115° C. with stirring for three hours. Subsequently, 36 parts of water were added in order to hydrolyze the ketimine groups. This gave a solution having a solids content of 54%. The head-group equivalent weight of the cationic polyelectrolyte (ID) was 712 g/mol.

1.1.3 The Coating of Metal Panels with the Constituent (IA)

A solution of the polyelectrolyte (IC), corresponding to 1424 parts of polyelectrolyte (IC), and a solution of the polyelectrolyte (ID), corresponding to 1099 parts of polyelectrolyte (ID) (cf. Examples 1.1.1 and 1.1.2), were mixed with one another so that the molar ratio of the head groups was 1:1. The resulting liquid phase (IG) was knife-coated onto bright metal panels 0.13 mm thick so as to give a dry film thickness of 60 μm. The film on the metal panel was subsequently baked at 130° C. for one hour.

Smooth, hard films of the constituent (IA) with high flexibility were obtained. They were resistant to aqueous solutions of salts and dilute acids. The coated metal panels could be deformed up to a T-bend of 0 without instances of film flaking.

Small-angle X-ray diffraction measurements on the films gave scatter peaks which indicated the presence of mesomorphic structures.

1.2 The Production of the Inventive Multicoat Surface-coating Systems 1.2.1 to 1.2.4

The coated metal panels produced in accordance with Example 1.1.3 were coated in Examples 1.2.1 to 1.2.3 with aqueous, thermally curable coating materials (IIB) so as to give in each case a dry film thickness of from 12 to 15 μm. The coating materials were then flashed off at 80° C. for 10 minutes and subsequently baked at 145° C. for 45 minutes.

In the case of Example 1.2.4, an aqueous base coat was applied first of all by the wet-on-wet technique so as to give a dry film thickness of from 12 to 15 μm. After the wet coat had been dried at 80° C. for 10 minutes, a conventional clear coat was applied so as to give a dry film thickness of from 25 to 30 μm, after which the two coats were baked at 130° C. for 30 minutes.

This was done using, for over the other and are cured after each application, which comprises (I) preparing at least one constituent (IA) which consists of or comprises mesomorphic polyelectrolyte complexes, by I.1) reacting, in a liquid phase (IB), I.1.1) at least one polymeric and/or oligomeric, organic, anionic polyelectrolyte (IC) with at least one polymeric and/or oligomeric, organic, cationic polyelectrolyte (ID) and/or at least one cationic surfactant (IE)
or 1.1.2) at least one polymeric and/or oligomeric, organic, cationic polyelectrolyte (ID) with at least one anionic surfactant (IF)
in a stoichiometric or non-stoichiometric ratio, I.2) pouring the resulting liquid phase (IG) onto a substrate or into a mold, and Example 1.2.1, a commercial aqueous coil-coating top coat material with a polyester as binder (IIC) and amino resins as crosslinking agents (IID) (CD24-7106 from BASF Coatings AG);

Example 1.2.2, a commercial aqueous packing tape coating material (CW24-9093 from BASF Coatings AG);

Example 1.2.3, a commercial aqueous one-component base coat material (FV92-0920 from BASF Coatings AG); and Example 1.2.4, a commercial aqueous base coat material (FV963CUF from BASF Coatings AG) and a commercial clear coat material (FF950111 from BASF Coatings AG).

The coats (IIA) produced using the aqueous coating materials (IIB) adhered to the coats comprising the constituent (IA). Overall, the resulting multicoat surface-coating systems were stable to corrosion.

What is claimed is:

1. A multicoat system comprising (I) at least one coating layer (IA) which comprises mesomorphic polyelectrolyte complexes selected from I.1.1 and I.1.2 and which are prepared by I.1) reacting, in a liquid phase (IB), I.1.1) at least one polyelectrolyte selected from the group oonsisiting of polymeric and oligomedc, organic, anionic polyelectrdytes (IC) with at least one compound selected from the group consisting of polymeric and oligomeric, organic, cationic polyalectrolytes (ID) and cationic surfactants(IE) or I.1.2) at least one polyelectrolyte selected fom the group consisting of polymeric and oligomeric, organic, catonic polyelectrolytes (ID) wifth at least one anionic surfactant (IF) in a stoichiometric or non-stoichiometric ratio, to form liquid phase (IG), I.2) pouring the resulting liquid phase (IG) onto a substrate or into a mold and I.3) allowing it to solidify, and I.4) heat-treating the resulting solid (IH); and (II) at least one three-dimension ally crosslinked coating layer (IIA) formed by (II1) applying to coaling layer (IA) at least one aqueous, thernally curable coaoing material (IIB) comprising II.1.1) at least one binder (IIC) and II.1.2) at least one crosslinking agent (IID), and II.2) thermally curing the resulting wet film (IIE).

2. A process for producing multicoat systems, comprising applying at least two coating constituents one over the other and curing after each application, comprising (I) preparing at least one constituent (IA) comprising mesomorphic polyelectmlyte complexes selected from I.1.1 and I.1.2, prepared by I.1) reacting, in a liquid phase (IB), I.1.1) at least one polyelectrolyte selected from the group consisting of polymeric and oligomeric, organic, anionic polyelectrolytes (IC) with at least one compound selected from polymeric and oligomeric, organic, cationic polyelectrolytes (ID) and cationic surfactants (IE) or I.1.2) at least one polyelectrolyte selected from the group consisting of polymeric and oligomeric, organic, cationic polyelectrolytes (ID) with at least one anionic surfactant (IF) in a stoichiometric or non-stoichiometric ratio, to form a liquid phase (IG), I.2) pouring the resulting liquid phase (IG) onto a substrate or into a mold, and I.3) allowing it to solidify, and I.4) heat-treating the resulting solid (IH); and then, on the resulting constituent (IA), (II) forming at least one coating layer (IIA) which is three-dimensionally crosslinked by II.1) applying to the surface of the constituent (IA) at least one aqueous, thermally curable coating material (IIB) comprising II.11) at least one binder (IIC) and II.1.2) at least one cross-linking agent (IID), and II.2) thermally curing the resulting wet film (IIE).

3. The multicoat system as claimed in claim 1, wherein the mesomorphic polyeletrolyte complexes produced in liquid phase (IB), are purified by repeated precipitation from a solution and redissolution.

4. The multicoat system as claimed in claim 1 wherein polyeleccolytes (IC) and (ID) selected are those whose polymer chains (IC) and (ID), viewed independently, would not be compatible and would seperate again in the soid phase.

5. The multicoat system as claimed in claim 1, wherein the solid (IH) is heat-treated for from 1 minute to 10 hours.

6. The multicoat system as claimed in claim 1, wherein the solid (IH) is heat-treated at temperatures between 80 and 300° C.

7. The multicoat system as daimed in claim 1 or the process of claim 2, wherein the constituent (IA), comprises additives (J), selected from the group consisting of polymers, crosslinking catalysts, initiators, photoinitiators, pigments, dyes, fillers, reinforcing fillers, rheological assistants, wetting agents, dispersants, defoamers, adhesion promoters, additives for improving substrate wetting, additives for improving surface smoothness, dulling agents, leveling agents, film-forming auxiliaries, driers, antiskinning agents, light stabilizers, corrosion inhibitors, biocides, flame retardants, polymerization inhibitors, photoinhibitors, plasticizers and mixtures thereof.

8. An article selected from the group consisting of automobile, coil and furniture, comprising at least one multicoat system as claimed in claim 1.

9. The process of claim 2, wherein the mesomorphic polyeletrolyte complexes produced in liquid phase (IB), are purified by repeated precipitation from a solution and redissolution.

10. The process as claimed in claim 2 wherein polyelectrolytes (IC) and (ID) selected are those whose polymer chains (IC) and (ID), viewed independently, would not be compatible and would seperate again in the solid phase.

11. The process as claimed in claim 2 wherein the solid (IH) is heat-treated for from 1 minute to 10 hours.

12. The process as claimed in claim 2 wherein the solid (IH) is heat-treated at temperatures between 80 and 300° C.

13. The multicoat system of claim 1 or the process of claim 2, wherein the coat (IIA) comprises additives (J), selected from the group consisting of polymers, crosslinking catalysts, initiators, photoinitiators, pigments, dyes, fillers, reinforcing fillers, rheological assistants, wetting agents, dispersants, defoamers, adhesion prornoters, additives for improving substrate wetting, additives for improving surface smoothness, dulling agents, leveling agents, film-forming auxiliaries, driers, antiskinning agents, light stabiliizers, corrosion inhibitors, biocides, flame retardants, polymerization inhibitors, photoinhibitors, plasticizers and mixtures thereof.

14. The multicoat system of claim 1 or the process of claim 2, wherein the aqueous, thermally curable coating materials (IIB) comprise additives (J), selected from the group consisting of polymers, crosslinking catalysts, initiators, photoinitiators, pigments, dyes, fillers, reinforcing fillers, rheological assistants, wetting agents, dispersants, defoamers, adhesion promoters, additves for improving substrate wetting, additives for improving surface smoothness, dulling agents, leveling agents, film-forming auxiliaries, driers, antiskinning agents, light stabilizers, corrosion inhibitors, biocides, flame retardants, polymerization inhibitors, photoinhibitors, plasticizers and mixtures thereof.

15. The multicoat system as claimed in claim 1, or the process for producing it as claimed in claim 2, wherein the aqueous, thermally curable coating materials (IIB) comprise constituents which are curable with actinic light, especially UV radiation, and electron beams.

16. A shaped part or laminate produced with the multicoat system of claim 1.

17. A coating selected from the group consisting of automotive original equipment manufacturer coatings, refinish coatings, industrial coatings, coil coatings and furniture coatings, comprising the multilayer system of claim 1.

18. An article, selected from the group consisting of automobiles, coil and furniture, comprising at least one multicoat system produced with the process as claimed in claim 2.

* * * * *